United States Patent Office 2,898,555
Patented Aug. 4, 1959

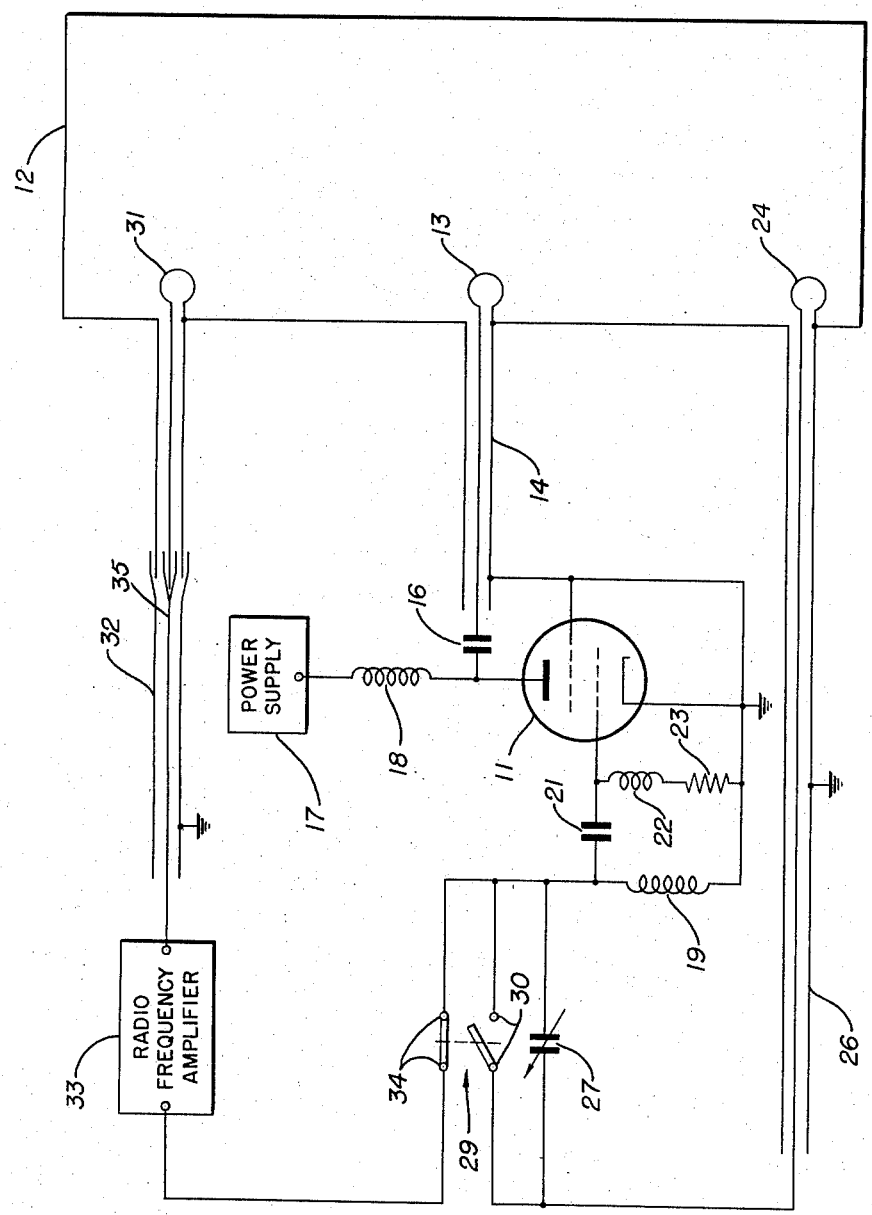

2,898,555

RESONANT CAVITY EXCITATION SYSTEM

William R. Baker, Berkeley, Calif., assignor to the United States of America as represented by the United States Atomic Energy Commission Application December 31, 1953, Serial No. 401,739

6 Claims. (Cl. 331—96)

The present invention relates to an improved cavity oscillator and more particularly to an improved cavity excitation circuit including means for facilitating the build-up of cavity oscillations.

The use of resonators or resonant cavities as the tank circuit for high frequency oscillators is well known in the art and it has been found that resonant cavity oscillators are well suited to produce very high voltage oscillations. In cavity oscillators the oscillation amplitude tends not to build up when the oscillator tube grid circuit is adjusted for proper operation at high voltage cavity oscillations. Build-up of the oscillation amplitude is prevented by the low gain of oscillator tubes for small input signals and the energy storage effect of the cavity. Further difficulty is encountered in building up high voltage oscillations in a resonant cavity due to a pressure loading effect which presumably results from cascade ionization within the cavity. Various methods have been employed to overcome the above-noted difficulties in resonant cavity excitation, as for example the excitation system disclosed in the copending application, Serial No. 419,124, filed March 26, 1954, which later issued as Patent No. 2,868,974, on January 13, 1959, by myself and others.

The present invention provides a solution to the above-noted difficulties whereby resonant cavity oscillations may be rapidly and efficiently raised from zero excitation to an oscillation amplitude of millions of volts. The present invention requires no separate oscillators operating at different levels and, in fact, includes but a minimum of apparatus aside from the main oscillator and resonator, it being contemplated by the present invention that an amplified cavity signal be applied to the oscillator tube grid circuit to drive the oscillator rapidly through the low level oscillation stages and that the cavity signal be directly applied to the oscillator tube grid circuit for high level oscillations.

It is an object of the present invention to provide an improved resonant cavity excitation system.

It is another object of the present invention to provide means for selectively energizing an oscillator tube for rapidly building up and maintaining high level cavity oscillations.

It is a further object of the present invention to provide in an oscillator circuit for a resonant cavity self excitation means for rapidly increasing oscillation amplitude and maintaining high level oscillations.

Yet another object of the present invention is to provide simplified means for controlling the build-up of oscillations in a resonator.

Numerous other possible objects and advantages of the invention will become apparent to those skilled in the art from the following description of a single preferred embodiment of the invention taken together with the attached drawing wherein the sole figure is an electrical diagram of the invention.

Considering now the elements and connections of the invention and referring to the drawing, there is provided a main oscillator tube 11, which represents any number of tubes that may be combined for this purpose, and which is adapted to energize a resonant cavity 12. Energization of the cavity 12 is accomplished by electromagnetic radiation from an exciting loop 13 disposed within the cavity and connected to the anode of the oscillator tube through a coaxial transmission line 14. The exciting loop 13 preferably has one end thereof grounded to the cavity wall and the other end connected to the central conductor of the transmission line which extends through the cavity wall with the outer transmission line conductor connected thereto. The oscillator tube 11 is capacitively coupled to the transmission line through a capacitor 16 located directly adjacent the tube anode and the transmission line extends one-half wave length between the exciting loop 13 and the tube. Also, the impedance of the loop 13 is made equal to the impedance of the line at zero frequency. Energization of the tube is provided by a power supply 17 having a positive terminal connected to the tube anode through an inductor 18 whose inductance value is chosen to resonate out the tube capacity, and the tube cathode may be grounded, as is the cavity 12.

Associated with the oscillator tube 11 is an input circuit including an inductor 19, grounded at one end and connected through a capacitor 21 to the control electrode of the oscillator tube 11. A second inductor 22 is connected directly to the control electrode and in series with a grounded resistor 23. The screen grid of the oscillator tube 11 may be grounded, as is the tube cathode. Normal excitation of the oscillator tube is provided by a first pickup loop 24 mounted within the cavity 12 with one end of the loop connected to the tank wall and the other joined to the central conductor of a coaxial transmission line 26 extending through the tank wall and having the outer conductor thereof grounded. The central conductor of this transmission line 26 is connected to the grid electrode capacitor 21 through a variable capacitor 27, and there is provided a double pole switch 29 having one set of terminals 30 connected in parallel with the variable capacitor 27.

In addition to the above-noted elements of the oscillator circuit there is further provided an auxiliary pickup loop 31 mounted within the cavity 12 and connected at one end to the cavity wall and at the other end to the central conductor of another coaxial transmission line 32 that extends through the tank wall with the outer conductor in contact therewith and which may include a trombone adjusting section 35 for controlling the phase of the signal passed thereby. The auxiliary pickup loop 31 feeds a radio-frequency amplifier 33 having its input connected to the central conductor of the transmission line 32. The output of the amplifier 33 is connected to the juncture of inductor 19 and capacitor 21 so as to selectively excite the oscillator tube 11. This connection from the amplifier 33 is made through the other terminals 34 of the switch 29 and the switch is designed so that the terminals 30 and 34 are alternately closed and opened, as shown.

Considering now the operation of the invention and again referring to the drawing, the oscillator tube 11 is energized to produce output signals which are transmitted through the transmission line 14 to the loop 13 within the cavity 12. The loop 13 radiates energy into the cavity 12 to excite same at a relatively low level. The pickup loop 31 receives a portion of this energy from the cavity and transmits same to the amplifier 33 through the transmission line 32. The amplified signals from the pickup loop 31 are applied to the input circuit of the oscillator tube through the switch 29 so that the control electrode voltage of the amplifier tube rapidly increases in phase with the oscillator tube output and the cavity oscillations rapidly increase to a high level. This build-up is speeded by the use of an amplified signal applied to the oscillator tube so that the oscillator output rapidly increases and the oscillations quickly pass through critical voltage values so as to preclude such as "ion locking." During the initial period of operation of the oscillator, i.e., the build-up period, the switch 29 is positioned with terminals 30 open and terminals 34 closed. The loop 24 is oriented to pick up a voltage 180° out of phase with the oscillator tube plate voltage and same is coupled through the capacitor 27 to the grid circuit where it opposes the signal fed back through the tube grid-plate capacitance. By varying the value of the capacitor the magnitude of signal fed therethrough substantially cancels out the current flowing due to the interelectrode capacity of the oscillator tube whereby the input circuit to the tube 11 remains in tune during the entire build-up period.

Application of power to the oscillator tube at the beginning of the build-up period produces a large unidirectional voltage drop across the tube with a consequent large power dissipation in the tube. The duration of this effect is minimized by the use of an amplified driving signal from the cavity as noted above; however, direct drive of the oscillator tube during high level operation thereof is desirable in order to eliminate the slight phase shift that may be introduced by the amplifier. Thus the amplified signal is employed to shorten the build-up period and the switch 29 is actuated to close terminals 30 and open terminals 34 thereof to transfer from amplified drive signal to direct drive signal when the oscillations have increased in amplitude through the low level range.

It will be appreciated that the switch 29 may be other than manually operated and it may, for example, be controlled by a voltage sensitive device so as to operate when the cavity oscillations reach a predetermined voltage level. Also the pickup loop 31 is preferably constructed and mounted for pivotal or translational movement whereby the loop is movable substantially out of the cavity 12 after the low level build-up period and if desired this retraction of the pickup loop 31 may be employed as the cut-off or switching means for the amplifier system to cut off the amplified signal when the direct drive signal is applied to the tube 11.

Various modifications of the invention are possible, as for example, the use of a signal pickup loop to supply a signal to a limiter amplifier that is employed to energize the oscillator tube control electrode. By employing a folded loop which together with the transmission line 14 is accurately one-half wave length and applying a sharp driving pulse to the oscillator tube grid a predetermined time after application of plate voltage to the oscillator tube a very rapid cavity oscillation buildup results. In this instance almost all of the energy stored in the system is in the cavity rather than a conventional tank circuit.

The present invention has been described with respect to but a single preferred embodiment, and it will be apparent to those skilled in the art that numerous variations and modifications thereof may be made within the spirit and scope of the invention so that no limitation is intended except by the terms of the following claims.

What is claimed is:

1. An improved resonant cavity excitation system comprising an oscillator tube adapted for connection to a resonant cavity for exciting same and having an input circuit, a first pickup loop adapted for disposition within a cavity for accepting oscillatory signals therefrom, an amplifier connected between said first pickup loop and the input circuit of said oscillator tube for driving said tube, a second pickup loop adapted for disposition within a resonant cavity for accepting oscillatory signals therein, and switching means connecting said second pickup loop and the input circuit of said oscillator tube for applying direct drive signals to said tube after oscillation build-up.

2. An improved cavity oscillator comprising a resonant cavity, an oscillator tube having an input circuit, an exciting loop disposed within said cavity and coupled to said oscillator tube, power supply means energizing said oscillator tube, first drive means including a pickup loop disposed within said cavity and an amplifier connected to said oscillator tube input circuit for energizing same during oscillation build-up, and second drive means including a pickup loop adapted for direct coupling to said oscillator tube input circuit following oscillation build-up.

3. An improved cavity resonator comprising a resonant cavity, an oscillator tube coupled to said cavity for energizing same and having an input circuit, first drive means including a pickup loop within said cavity and an amplifier connected to the input circuit of said oscillator tube for applying an amplified cavity signal thereto, and second drive means connected to said oscillator tube input circuit and applying a phase shifted voltage thereto during oscillation build-up for canceling out signals produced by interelectrode capacitance of said oscillator tube.

4. An improved cavity resonator comprising a resonant cavity, an oscillator tube coupled to said cavity for energizing same and having an input circuit, first drive means including a pickup loop within said cavity and an amplifier connected to said oscillator tube input circuit for energizing same during cavity oscillation build-up, second drive means having a pickup loop within said cavity, and switching means having a first position coupling signals from said first drive means to said input circuit in driving relationship and coupling signals from said second drive means to said input circuit in opposite phase to oscillator tube interelectrode capacitance current and a second position coupling signals from said second drive means only to said input circuit in driving relationship.

5. An improved cavity resonator as claimed in claim 4 further defined by said switch means including a capacitor and a switch connected in parallel therewith between the pickup loop of said second drive means and said oscillator tube input circuit.

6. An improved cavity exciter for a resonant cavity comprising an oscillator tube adapted for coupling to a resonant cavity to energize same and having an input circuit, first and second pickup loops adapted for disposition within a resonant cavity coupled to said oscillator tube, an amplifier tube connected between said first pickup loop and the input circuit of said oscillator tube for applying amplified cavity signals thereto whereby cavity oscillation build-up is speeded, a capacitor connected between said second pickup loop and the input circuit of said oscillator tube for shifting the phase of signals from the former to oppose interelectrode capacitance current flow in the latter, and switching means connected in parallel with said capacitor for by-passing same following cavity oscillation build-up whereby said oscillator is initially driven by an amplified signal and then driven by a direct cavity signal.

References Cited in the file of this patent

UNITED STATES PATENTS

| | | |
|---|---|---|
| 2,213,398 | Kircher | Sept. 3, 1940 |
| 2,215,582 | Goldstine | Sept. 24, 1940 |
| 2,446,829 | Hergenrather | Aug. 10, 1948 |
| 2,498,495 | Jensen | Feb. 21, 1950 |
| 2,524,175 | Preist | Oct. 3, 1950 |